(12) United States Patent
He et al.

(10) Patent No.: US 12,507,384 B2
(45) Date of Patent: Dec. 23, 2025

(54) SYSTEM AND METHOD OF DISSIPATING HEAT FROM AN INFORMATION HANDLING SYSTEM

(71) Applicant: Dell Products L.P., Round Rock, TX (US)

(72) Inventors: Qinghong He, Austin, TX (US); Allen B. McKittrick, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 314 days.

(21) Appl. No.: 17/932,591

(22) Filed: Sep. 15, 2022

(65) Prior Publication Data

US 2024/0098942 A1    Mar. 21, 2024

(51) Int. Cl.
*H05K 7/20*    (2006.01)

(52) U.S. Cl.
CPC ............................. *H05K 7/20781* (2013.01)

(58) Field of Classification Search
CPC .......... H05K 7/20781; H05K 7/20336; H05K 7/20954; H05K 7/20963; G06F 1/20; G06F 1/203; G06F 1/206; G06F 1/1616; H01L 23/34; H01L 23/427; H01L 23/467
See application file for complete search history.

(56) References Cited

U.S. PATENT DOCUMENTS

| | | |
|---|---|---|
| 9,134,808 B2 | 9/2015 | Siddiqui et al. |
| 10,635,132 B1 | 4/2020 | Brocklesby et al. |
| 11,392,190 B2 | 7/2022 | Chang et al. |
| 2004/0114322 A1* | 6/2004 | Agata ..................... G06F 1/203 361/679.27 |
| 2006/0152905 A1* | 7/2006 | Kim ......................... H05K 5/02 361/715 |

(Continued)

FOREIGN PATENT DOCUMENTS

| | | | |
|---|---|---|---|
| WO | 2015/179257 A1 | 11/2015 | |
| WO | WO-2021129692 A9 * | 9/2021 | ......... F28D 15/0233 |

OTHER PUBLICATIONS

"Transverse." Merriam-Webster.com Dictionary, Merriam-Webster, https://www.merriam-webster.com/dictionary/transverse. Accessed Dec. 5, 2024. (Year: 2024).*

(Continued)

*Primary Examiner* — Jayprakash N Gandhi
*Assistant Examiner* — Jeffrey Francis Stoll
(74) *Attorney, Agent, or Firm* — McDermott Will & Schulte

(57) ABSTRACT

In one or more embodiments, an information handling system may include: a chassis that houses the information handling system and that includes a stand configured to rotate away from and towards a portion of a rear side of the chassis; a heat transfer device (HTD) that includes a fluid; and at least one flexible thermally conductive foil (FTCF) thermally coupled to the HTD and thermally coupled the stand of the chassis. For example, the at least one FTCF may be configured to thermally transfer heat from the HTD to the stand of the chassis. In another example, the chassis may include at least one hinge that couples the stand to the chassis, in which the at least one hinge is configured to permit the stand rotate through an angle. For instance, the at least one hinge may permit the stand to be configured at different positions within the angle.

12 Claims, 16 Drawing Sheets

(56) References Cited

U.S. PATENT DOCUMENTS

| | | | |
|---|---|---|---|
| 2007/0230132 A1* | 10/2007 | Lee | H05K 7/20963 361/707 |
| 2013/0229773 A1* | 9/2013 | Siddiqui | G06F 3/0414 248/688 |
| 2014/0240921 A1* | 8/2014 | Sultenfuss | G06F 1/1656 361/679.54 |
| 2016/0007497 A1* | 1/2016 | North | G06F 1/20 29/890.03 |
| 2016/0187927 A1* | 6/2016 | Macdonald | G06F 1/206 361/679.41 |
| 2016/0369543 A1* | 12/2016 | Park | E05D 11/1007 |
| 2018/0023904 A1* | 1/2018 | Kato | B32B 27/38 165/80.2 |
| 2018/0235084 A1* | 8/2018 | Aurongzeb | H05K 3/0064 |
| 2019/0035324 A1* | 1/2019 | Aurongzeb | G06F 1/1652 |
| 2019/0278324 A1* | 9/2019 | Yoon | G06F 1/1616 |
| 2020/0128687 A1* | 4/2020 | Ku | G06F 1/1681 |
| 2021/0112685 A1* | 4/2021 | Magi | H05K 7/20454 |
| 2021/0185852 A1* | 6/2021 | Yang | H05K 7/2039 |
| 2021/0271304 A1 | 9/2021 | Chang et al. | |
| 2022/0183186 A1* | 6/2022 | Huang | H05K 7/20445 |
| 2023/0337406 A1* | 10/2023 | Bawa | H05K 7/2099 |
| 2024/0268204 A1* | 8/2024 | Fu | H10K 59/87 |

OTHER PUBLICATIONS

PORON—Material Selection Guide Industrial Applications, by Rogers Corporation, 7 pages, 2018.

Material Solutions for the Appliance Industry, by Rogers Corporation, 2 pages, 2021.

* cited by examiner

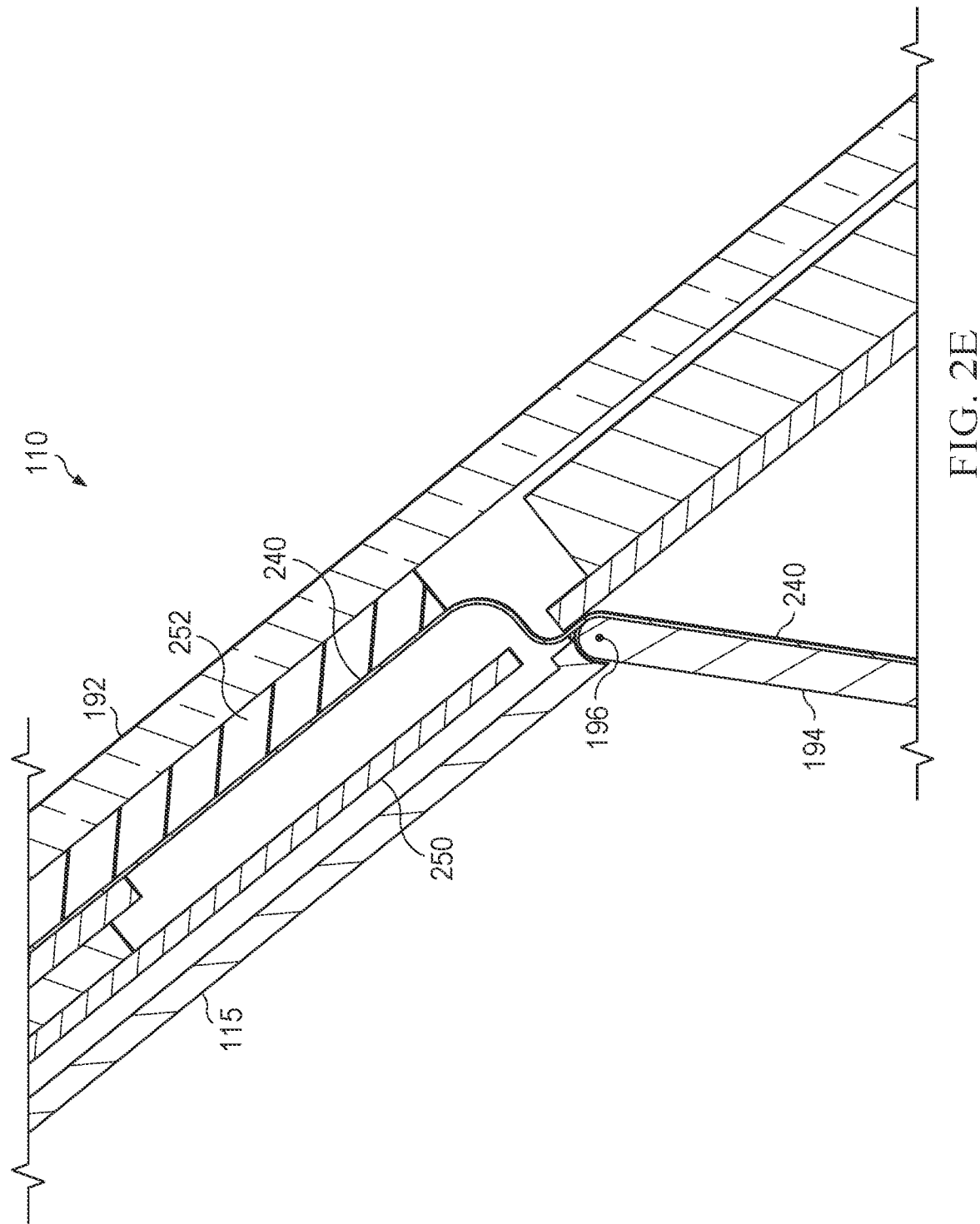

SYSTEM AND METHOD OF DISSIPATING HEAT FROM AN INFORMATION HANDLING SYSTEM

BACKGROUND

Field of the Disclosure

This disclosure relates generally to information handling systems and more particularly to dissipating heat from an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, an information handling system may include: at least one processor; a memory medium, coupled to the at least one processor, that stores an operating system and at least one application executable by the at least one processor; a chassis that houses the information handling system and that includes a stand configured to rotate away from and towards a portion of a rear side of the chassis; a heat transfer device that includes a fluid; and at least one flexible thermally conductive foil thermally coupled to the heat transfer device and thermally coupled the stand of the chassis. For example, the at least one flexible thermally conductive foil may be configured to thermally transfer heat from the heat transfer device to the stand of the chassis. In one or more embodiments, the information handling system may further include a display and a material disposed between the display and the at least one flexible thermally conductive foil. For example, the chassis may house the display. For instance, the material may be pliable and may be configured to transfer pressure from the display to the at least one flexible thermally conductive foil.

In one or more embodiments, the information handling system may be a tablet information handling system or a wireless telephone information handling system. For example, the stand may be a kickstand of the chassis. In one or more embodiments, the stand may include a metal. In one or more embodiments, the stand may include graphite. In one or more embodiments, the at least one flexible thermally conductive foil may include at least one graphite foil. In one or more embodiments, the information handling system may further include a graphite beam. For example, the graphite beam may be fastened to the at least one flexible thermally conductive foil. For instance, the graphite beam may be configured to transfer heat from the at least one flexible thermally conductive foil to an environment surrounding the information handling system. In one or more embodiments, the graphite beam may be one-half millimeter to three millimeters thick. In one or more embodiments, the chassis may include at least one hinge that couples the stand to the chassis. For example, the stand may be rotatably attached to the chassis.

In one instance, the at least one hinge may be configured to be adjusted to preset hinge stops that permit the stand to be configured at different preset positions. In another instance, the at least one hinge may be configured to be adjusted to continuously rotate through an angle, which permits the stand to be configured at different positions within the angle. In one or more embodiments, the stand may be removable. In one or more embodiments, the information handling system may further include at least one thermal pipe thermally coupled to the heat transfer device. For example, the at least one flexible thermally conductive foil may be thermally coupled to the at least one thermal pipe.

In one or more embodiments, a heat removal system may include: a vapor chamber that includes a fluid; a chassis that is configured to house an information handling system and that includes a stand configured to rotate away from and towards a portion of a rear side of the chassis; and at least one graphite foil thermally coupled to the vapor chamber and thermally coupled the stand of the chassis. For example, the at least one graphite foil may be configured to thermally transfer heat from the vapor chamber to the stand of the chassis. In one or more embodiments, the heat removal system may further include at least one thermal pipe thermally coupled to the vapor chamber. For example, the at least one graphite foil may be thermally coupled to the at least one thermal pipe.

In one or more embodiments, the chassis may include at least one hinge that couples the stand to the chassis. In one or more embodiments, the stand may include at least one of a metal and graphite. In one or more embodiments, the chassis may include at least one hinge that couples the stand to the chassis. For example, the at least one hinge may be configured to permit the stand rotate through an angle.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIG. 2E illustrates an example of a cross section of an information handling system, according to one or more embodiments;

DETAILED DESCRIPTION

Figure 1A:
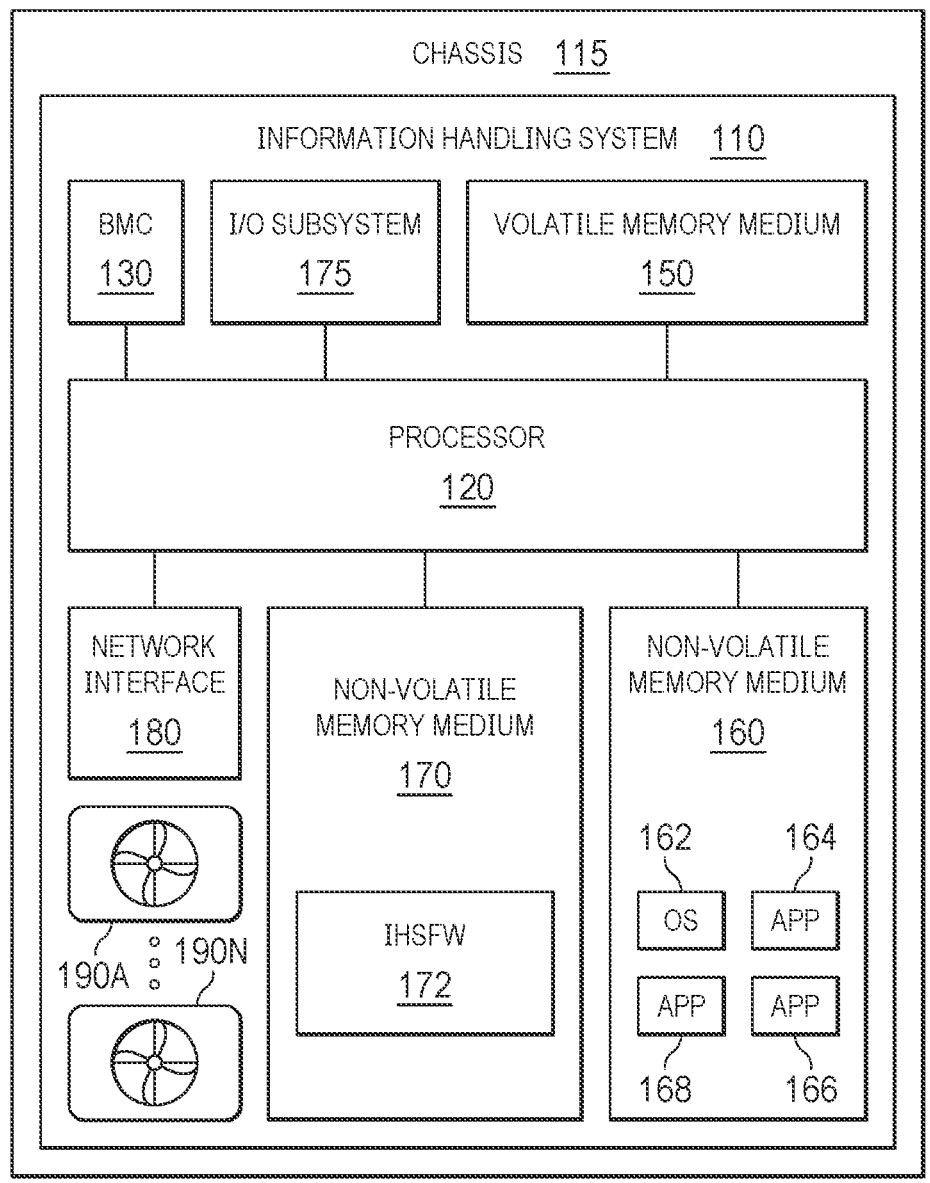
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, as portable information handling systems increase in information processing power, an ability to dissipate heat may increase as well. For example, as portable information handling systems become smaller, an ability to dissipate heat may increase to accommodate increases for higher thermal design power (TDP). In one or more embodiments, dissipating heat from a portable information handling system may include spreading the heat through the portable information handling system and/or a chassis that houses the portable information handling system. For example, one or more of a vapor chamber, a heat pipe, and graphite (e.g., graphite foil) may be utilized in spreading the heat through the portable information handling system and/or a chassis that houses the portable information handling system. In one or more embodiments, a chassis of a portable information handling system may include aluminum. For example, aluminum may be associated with a high strength to weight ratio.

In one or more embodiments, a stand of a chassis (e.g., a kickstand of a chassis) of the portable information handling system may be utilized to dissipate heat from the portable information handling system. For example, when the stand is utilized to dissipate heat from the portable information handling system a processor of the portable information handling system may utilize greater power. For instance, the processor may utilize two or more Watts of power while maintaining a chassis temperature previously measured without utilizing the stand to dissipate heat from the portable information handling system. In one or more embodiments, a temperature associated with the stand may increase, but the temperature may be below a threshold of usability by a user (e.g., a person).

In one or more embodiments, flexible graphite may include expandable flake graphite. For example, graphite foil may be manufactured from mineral graphite (e.g., expandable flake graphite). For instance, graphite foil may be referred to as flexible graphite. In one or more embodiments, graphite foil may be is flexible and/or conformable. In one example, flexible may be utilized as a gasket material. In a second example, graphite foil may be utilized in one or more electronic applications. In a third example, graphite foil may be utilized in one or more electrochemical applications. In another example, graphite foil may be utilized in one or more thermal applications.

In one or more embodiments, graphite foil may include a percentage of carbon of ninety-nine percent (99%) or higher. In one or more embodiments, graphite foil may have a density of 9802 Newtons per cubic meter ($N/m^3$) to 10996 $N/m^3$. In one or more embodiments, graphite foil may have a thermal conductivity of five to one hundred and forty (5-140) Watts per meter Kelvin (W/m·K). In one or more embodiments, graphite foil may have compatible pH range of one to fourteen (1-14). For example, graphite foil may not be adversely affected by a chemical or chemical compound associated with a pH within the compatible pH range of graphite foil.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

In one or more embodiments, IHS 110 may include a chassis 115. For example, chassis 115 may house IHS 110. In one or more embodiments, IHS 110 may include a processor 120, a baseboard management controller (BMC) 130, a volatile memory medium 150, non-volatile memory media 160 and 170, an I/O subsystem 175, and a network interface 180. For example, BMC 130, volatile memory medium 150, non-volatile memory media 160 and 170, I/O subsystem 175, and network interface 180 may be communicatively coupled to processor 120.

In one or more embodiments, an information handling system may include one or more fans. For example, IHS 110 may include fans 190A-190N. Although IHS 110 is illustrated as including fans 190A-190N, IHS 110 may include any number of fans 190, according to one or more embodiments. In one or more embodiments, a fan 190 may move air. In one example, a fan 190 may move air within IHS 110. In a second example, a fan 190 may move air into IHS 110, may intake air into IHS 110, and/or may bring air into IHS 110. In another example, a fan 190 may move air out of IHS 110, may remove air from IHS 110, and/or may expel air from IHS 110. In one or more embodiments, BMC 130 may control one or more of fans 190A-190N. For example, BMC 130 may provide control information to a fan controller (not specifically illustrated), which may control one or more of fans 190A-190N. For instance, BMC 130 may provide control information to the fan controller via a SMBus. In one or more embodiments, a fan 190 may generate one or more sounds and/or one or more vibrations as fan 190 operates to move air. In one or more embodiments, the one or more sounds the fan 190 generates may be quantified as one or more sound pressure levels.

In one or more embodiments, chassis 115 may house one or more components of IHS 110. For example, the one or more components of IHS 110 may include one or more of processor 120, BMC 130, volatile memory medium 150, non-volatile memory media 160 and 170, I/O subsystem 175, network interface 180, and fans 190A-190N, among others.

In one or more embodiments, one or more of BMC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, volatile memory medium 150, non-volatile memory media 160 and 170, I/O subsystem 175, and network interface 180 may be communicatively coupled to processor 120 via one or more PCIe root complexes. In another example, one or more of BMC 130, I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated). In one or more embodiments, an HDD (e.g., a hard disk drive, a hard disk, a hard drive, etc.) may be or include an electro-mechanical data storage device. For example, the HDD may store and may retrieve digital data using magnetic storage via one or more rigid rotating platters, which may be coated with magnetic material. For instance, the platters may be associated with one or more magnetic heads, which may be arranged on a movable actuator arm. As an example, the one or more magnetic heads may read data from and write data to the platter surfaces. In one or more embodiments, data may be accessed in a random-access manner, which may include accessing individual blocks of data that may be stored and retrieved in any order. In one or more embodiments, an HDD may be a type of a non-volatile memory medium, which can retain stored data even when powered off and/or when power is removed from the HDD. In one or more embodiments, a non-volatile memory medium 160 may include an HDD.

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

Figure 1B:
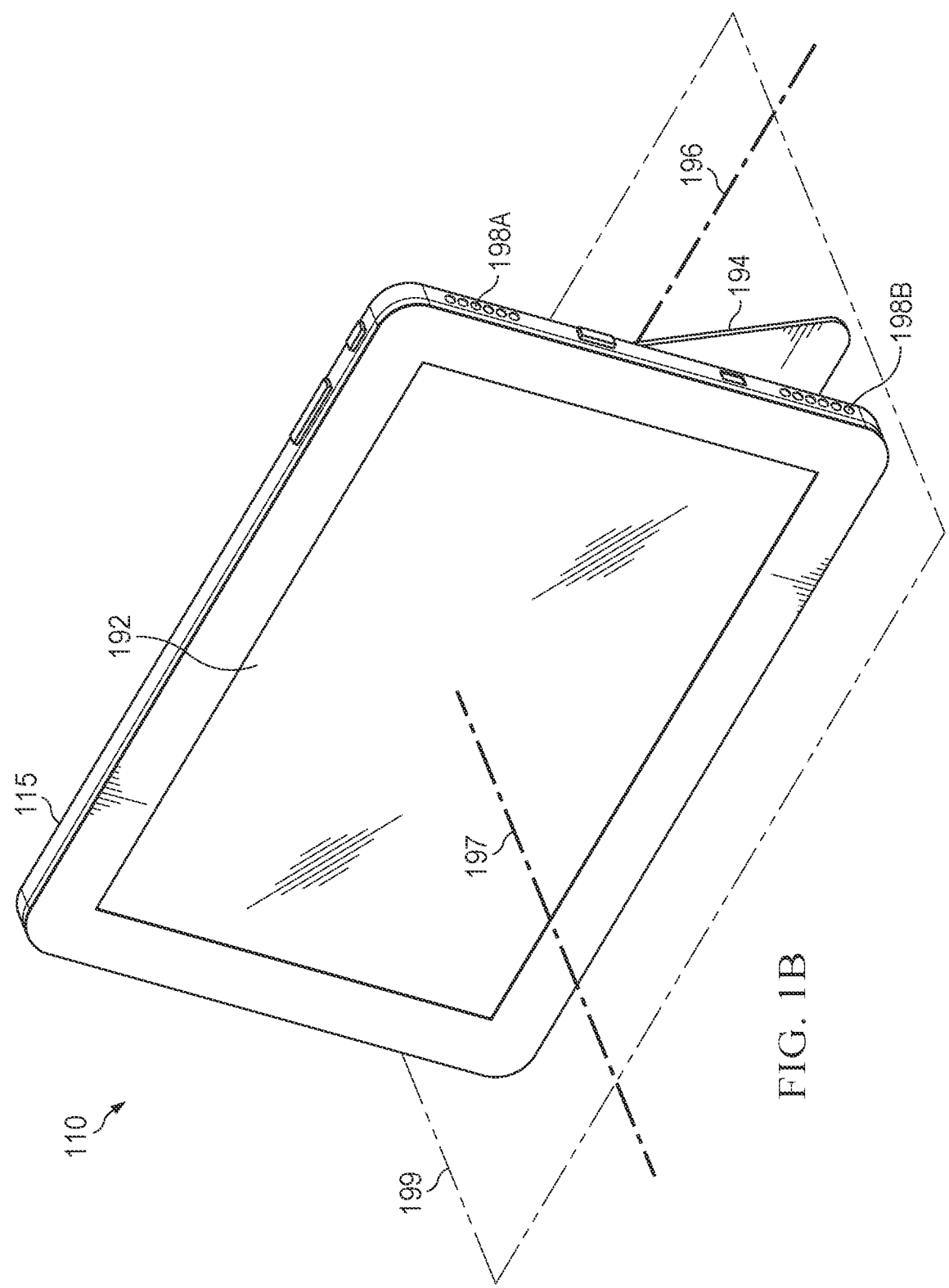
FIG. 1B illustrates another example of an information handling system, according to one or more embodiments.

Turning now to FIG. 1B, an example of a chassis of an information handling system that includes a stand is illustrated, according to one or more embodiments. In one or more embodiments, IHS 110 may include a display 192. For example, display 192 may be mounted in chassis 115. In one or more embodiments, IHS 110 may be a portable information handling system. In one example, IHS 110 may be a tablet information handling system. In another example, IHS 110 may be a wireless telephone information handling system. In one or more embodiments, a portion of chassis 115 may include a stand 194. For example, stand 194 may be or may be called a kickstand. For instance, stand 194 may be disposed on a rear side and/or a back side of chassis 115.

In one or more embodiments, when stand 194 is in a closed position, stand 194 may form a portion of a rear side and/or a back side of chassis 115. For example, when stand 194 is in a closed position, stand 194 may conform to a surface contour of chassis 115. In one instance, when stand 194 is in a closed position, stand 194 may not protrude from a plane formed by a portion of a rear side and/or a back side of chassis 115. In another instance, when stand 194 is in a closed position, stand 194 may protrude a few millimeters (e.g., 1-4 millimeters) from a plane formed by a portion of a rear side and/or a back side of chassis 115.

In one or more embodiments, stand 194 may be rotated away from a portion of a rear side and/or a back side of chassis 115. For example, stand 194 may be rotatably attached to chassis 115. For instance, stand 194 may be rotatably attached to chassis 115 along a seam via a hinge assembly and/or a hinge system. In one or more embodiments, stand 194 may be rotated to various positions to provide support for different orientations of chassis 115. For example, chassis 115 may include one or more hinges, which may permit stand 194 to be attached to chassis 115 and may permit stand 194 to rotate about axis 196. In one instance, stand 194 may be adjusted to one or more preset hinge stops that may permit stand 194 to be configured at different preset positions. In another instance, stand 194 may continuously rotate through an angle, which may permit stand 194 to be configured at different positions within the angle.

In one or more embodiments, stand 194 may have one or more surface contacts, which may be configured to reduce transmission of vibrations between stand 194 and a surface 199 (e.g., a surface of a table, a desk, etc.) on which chassis 115 is positioned and/or rests. For instance, the one or more surface contacts may include one or more elastomers. As an example, an elastomer may include any rubbery material, which may include long chainlike molecules and/or polymers that may be capable of recovering an original shape after being stretched or compressed.

In one or more embodiments, stand 194 may be removably attached to at least one hinge. For example, stand 194 may be detached from chassis 115. In one or more embodiments, stand 194 may not be removably attached to at least one hinge. For example, stand 194 may not be detached from chassis 115. For instance, stand 194 may be permanently attached to chassis 115

In one or more embodiments, stand 194 may rotate about an axis 196. For example, axis 196 may be orthogonal to a longitudinal axis 197 of chassis 115. For instance, display 192 may share longitudinal axis 197 with chassis 115. In one or more embodiments, chassis 115 may include one or more vents. For example, chassis 115 may include vents 198A and 198B. For instance, vents 198A and 198B may be in one or more sides of chassis 115. Although chassis 115 is shown with vents 198A and 198B, chassis 115 may include any number of vents 198, according to one or more embodiments.

Figure 2A:
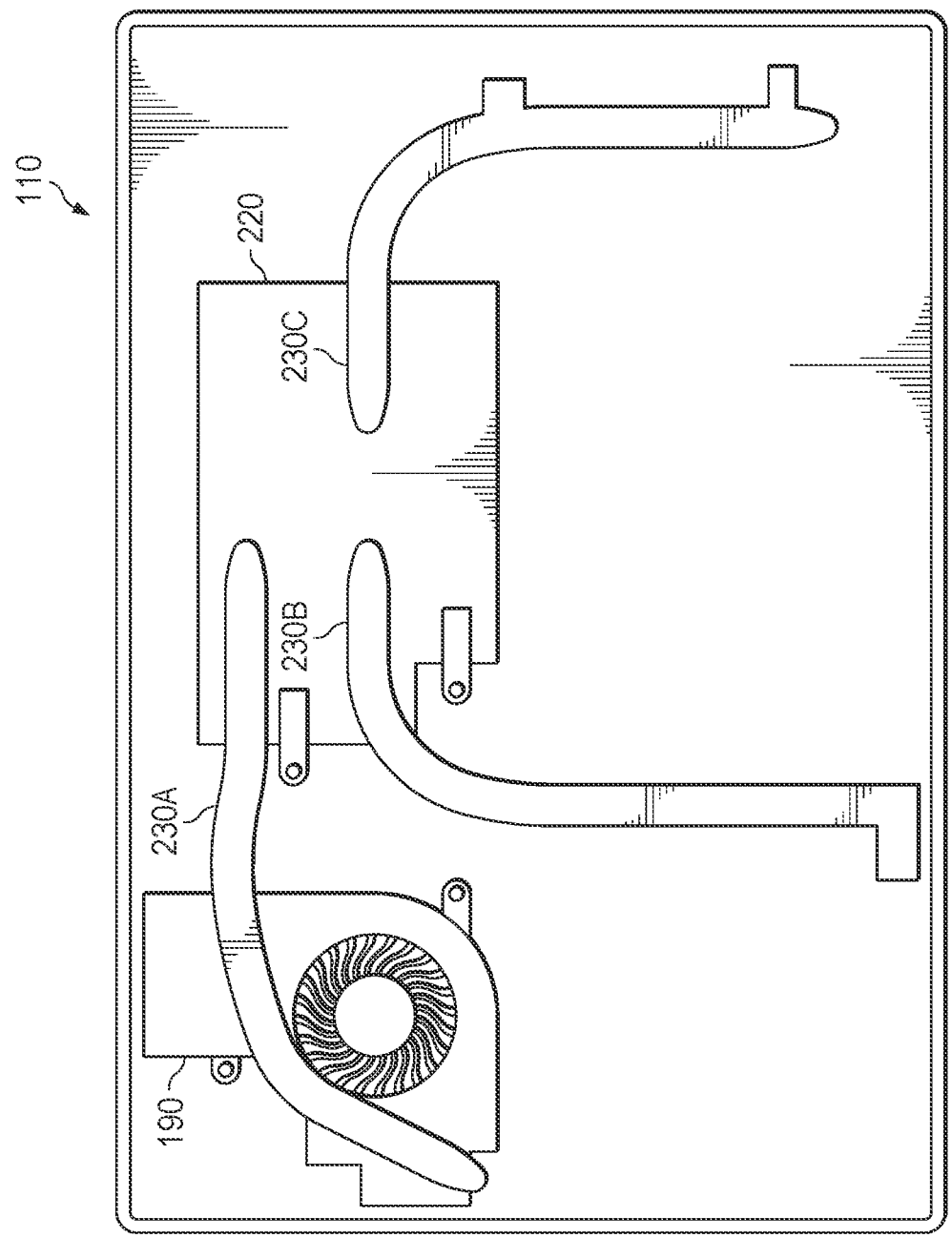
FIG. 2A illustrates an example of components configured to remove heat from an information handling system, according to one or more embodiments.

Turning now to FIG. 2A, an example of components configured to remove heat from an information handling system is illustrated, according to one or more embodiments. In one or more embodiments, IHS 110 may include a fan 190, a heat transfer device (HTD) 220, and heat pipes 230A-230C, among others. In one or more embodiments, heat transfer device 220 may be or may include a vapor chamber. For example, a two-phase device used to spread heat from a heat source to a heat sink. For instance, a vapor chamber may be called a planar heat pipe. In one or more embodiments, heat transfer device 220 may be or may include a metal plate. In one example, the metal plate may be or may include a copper plate. In another example, the metal plate may be or may include an aluminum plate.

In one or more embodiments, heat transfer device 220 may include an enclosed chamber. For example, the enclosed chamber may include a vacuum-sealed envelope that houses a wick structure and a fluid. For instance, the wick structure may be attached to one or more inner walls of the enclosed chamber. As an example, a wick of the wick structure may absorb the fluid in liquid form and may aid in distributing liquid from cooler to hotter areas of heat transfer device 220. As another example, the fluid may turn to a gaseous state (e.g., vapor), which may carry heat to cooler areas of heat transfer device 220. In one or more embodiments, a boiling point of the fluid may be configured based at least on a pressure inside the enclosed chamber. For example, if the pressure inside the enclosed chamber is less than one atmosphere and if the fluid is water, the boiling point of the fluid may be less than one hundred degrees Celsius (100° C.). For instance, as the pressure inside the enclosed chamber decreases, the boiling point of the fluid may decrease as well. In one or more embodiments, the wick of the wick structure may be metal sintered. For example, the wick of the wick structure may be copper sintered.

In one or more embodiments, heat transfer device 220 may include a fluid. In one example, the fluid may be in a liquid form. In another example, the fluid may be in a gaseous form (e.g., vapor). In one or more embodiments, the fluid may include one or more of water and an alcohol, among others. In one or more embodiments, a heat pipe 230 may include a fluid. In one example, the fluid may be in a liquid form. In another example, the fluid may be in a gaseous form. In one or more embodiments, the fluid may include one or more of water and an alcohol, among others. In one or more embodiments, the fluid may travel within a heat pipe 230 in a gaseous form in and a liquid form. For example, a heat pipe 230 may include a wicking material. For example, the wicking material may transfer the fluid when the fluid is in a liquid form. In one or more embodiments, a heat pipe 230 may include one or more flat or relative flat portions.

In one or more embodiments, a heat pipe 230 may transfer heat to and/or from heat transfer device 220. In one example, heat pipe 230A may transfer heat from heat transfer device 220. For instance, heat pipe 230A may transfer heat to fan 190. In a second example, heat pipe 230B may transfer heat to heat transfer device 220. For instance, heat pipe 230B may transfer heat from one or more components of IHS 110. In another example, heat pipe 230C may transfer heat to heat transfer device 220. For instance, heat pipe 230C may transfer heat from one or more components of IHS 110. In one or more embodiments, heat transfer device 220 may transfer heat from one or more components of IHS 110.

Figure 2B:
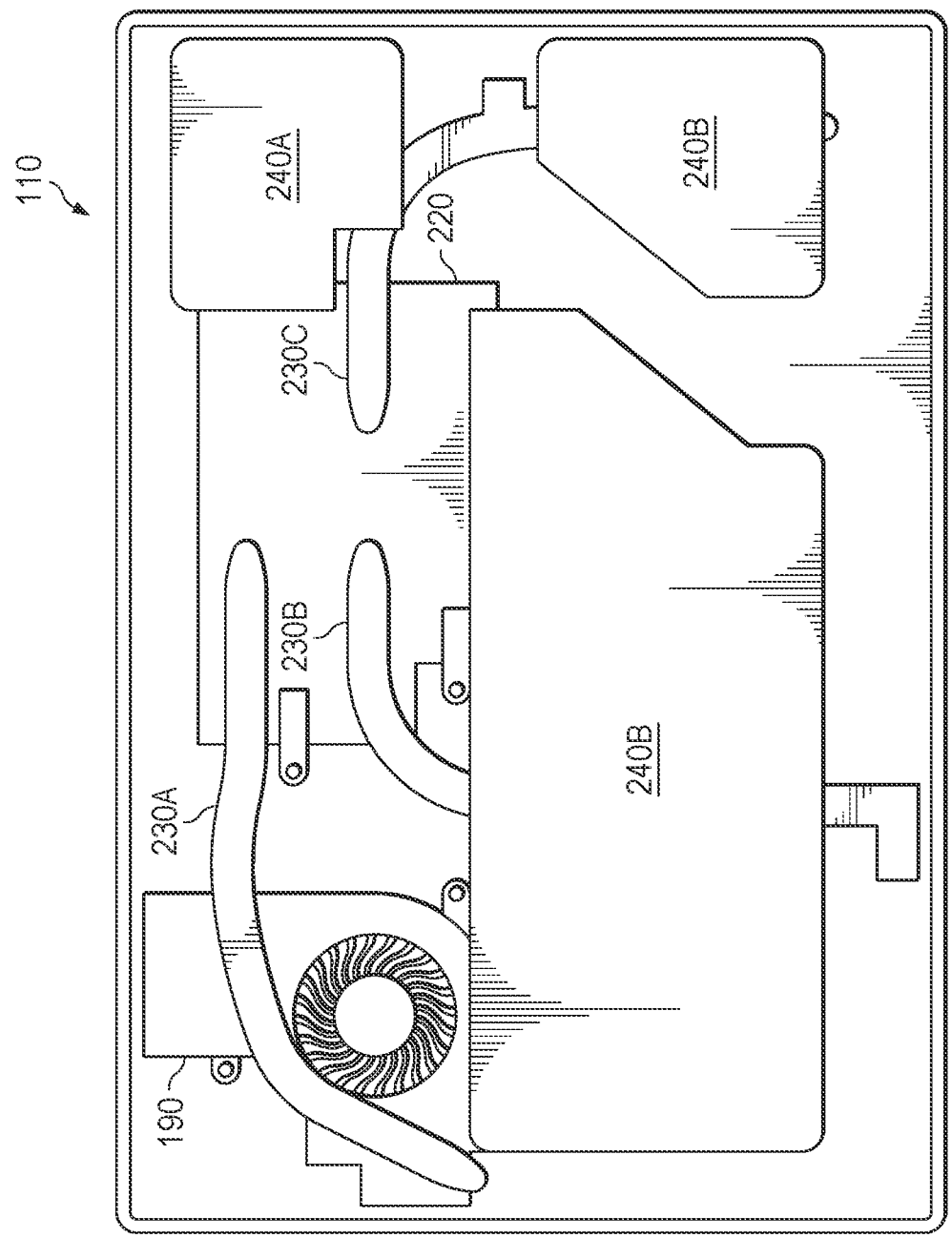
FIG. 2B illustrates another example of components configured to remove heat from an information handling system, according to one or more embodiments.

Turning now to FIG. 2B, another example of components configured to remove heat from an information handling system is illustrated, according to one or more embodiments. In one or more embodiments, IHS 110 may include a flexible thermally conductive foil (FTCF) (e.g., a graphite sheet, a metallic foil, etc.). In one example, IHS 110 may include a flexible thermally conductive foil 240A. In one instance, flexible thermally conductive foil 240A may transfer heat from one or more components of IHS 110 to heat pipe 230C. In another instance, flexible thermally conductive foil 240A may transfer heat from one or more components of IHS 110 to heat transfer device 220. In another example, IHS 110 may include a flexible thermally conductive foil 240B. In one instance, flexible thermally conductive foil 240B may transfer heat from one or more components of IHS 110 to heat pipe 230B. In a second instance, flexible thermally conductive foil 240B may transfer heat from one or more components of IHS 110 to heat pipe 230C. In a third instance, flexible thermally conductive foil 240B may transfer heat from heat pipe 230B to heat pipe 230C. In another instance, flexible thermally conductive foil 240B may transfer heat from heat pipe 230C to heat pipe 230B. In one or more embodiments, a flexible thermally conductive foil 240 may be fastened to a component of IHS 110 via a thermally conductive adhesive. In one or more embodiments, a flexible thermally conductive foil 240 may be or may include a graphite foil. In one or more embodiments, a flexible thermally conductive foil 240 may be or may include a copper foil.

Figure 2C:
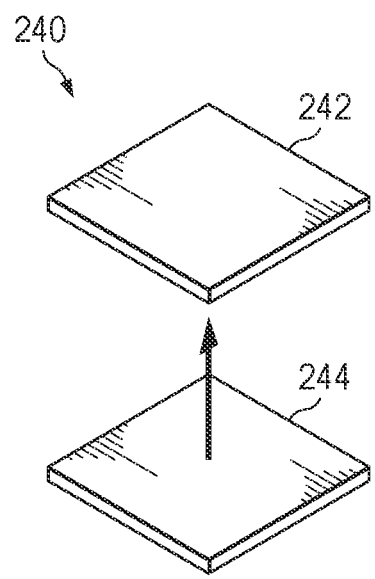
FIG. 2C illustrates an example of a flexible thermally conductive foil, according to one or more embodiments.

Turning now to FIG. 2C, an example of a flexible thermally conductive foil is illustrated, according to one or more embodiments. In one or more embodiments, a flexible thermally conductive foil 240 may include graphite 242 and a polymer 244. For example, polymer 244 may provide structure to graphite 242. For instance, graphite 242 may be fastened to polymer 244. In one or more embodiments, flexible thermally conductive foil 240 may include a single sheet of graphite 242 and a single sheet of polymer 244.

In one or more embodiments, polymer 244 may include a biaxially-oriented polyethylene terephthalate (BoPET), which may be known as and/or called MYLAR®. For example, BoPET may include a polyester film made from stretched polyethylene terephthalate (PET). For instance, BoPET may be utilized for one or more of its high tensile strength, dimensional stability, chemical satiability, transparency, gas barrier properties, reflectivity, aroma barrier properties, and electrical insulation, among others.

Figure 2D:
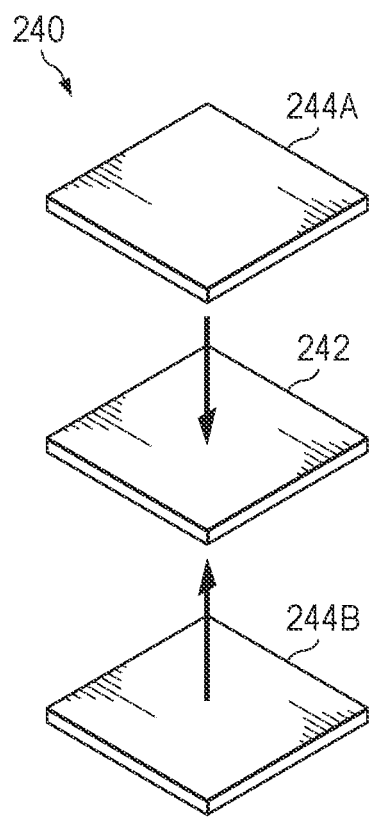
FIG. 2D illustrates another example of a flexible thermally conductive foil, according to one or more embodiments.

Turning now to FIG. 2D, another example of a flexible thermally conductive foil is illustrated, according to one or more embodiments. In one or more embodiments, a flexible thermally conductive foil 240 may include graphite 242, a polymer 244A, and a polymer 244B. For example, polymers 244A and 244B may provide structure to graphite 242. For instance, graphite 242 may be fastened to polymers 244A and 244B. As an example, graphite 242 may be sandwiched between polymers 244A and 244B. In one or more embodiments, flexible thermally conductive foil 240 may include a single sheet of graphite 242 sandwiched between two single sheets of polymers 244A and 244B.

Turning now to FIG. 2E, an example of a cross section of an information handling system is illustrated, according to one or more embodiments. In one or more embodiments, IHS 110 may include a motherboard 250. For example, one or more components of IHS 110 may be mounted to motherboard 250. For instance, the one or more components of IHS 110 may include one or more of processor 120, BMC 130, volatile memory medium 150, non-volatile memory media 160 and 170, I/O subsystem 175, network interface 180, and fans 190A-190N, among others. In one or more embodiments, flexible thermally conductive foil 240 may be thermally coupled motherboard 250 and/or one or more components mounted to motherboard 250. For example, a material 252 may apply pressure to flexible thermally conductive foil 240. For instance, the pressure applied to flexible thermally conductive foil 240 may thermally couple flexible thermally conductive foil 240 to motherboard 250 and/or one or more components mounted to motherboard 250.

In one or more embodiments, material 252 may include a urethane, which may include or may be an open cell foam. For example, material 252 may be or may include PORON®. In one or more embodiments, material 252 may be or may include an elastic material and/or a compressible material. For example, material 252 may be fifty percent (50%) to ninety percent (90%) compressible. For instance, material 252 may be utilized in cushioning, padding, compression, and/or sealing applications. As an example, material 252 may be utilized in gaskets, protective gear, cushions, and/or footwear, among others.

In one or more embodiments, flexible thermally conductive foil 240 may be coupled to stand 194. For example, flexible thermally conductive foil 240 may be thermally coupled to stand 194. In one instance, flexible thermally conductive foil 240 may transfer heat from the one or more components of IHS 110 to stand 194. In another instance, flexible thermally conductive foil 240 may transfer heat from one or more of material 252, heat pipes 230A-230C, graphite foils 240A and 240B, and heat transfer device 220, among others. As an example, stand 194 may dissipate the heat into a surrounding environment of IHS 110. In one or more embodiments, stand 194 may include one or more of a metal, a metal alloy, and graphite, among others. For example, flexible thermally conductive foil 240 may be thermally coupled to stand 194. For instance, flexible thermally conductive foil 240 may transfer heat to stand 194, which may transfer the heat to a surrounding environment of IHS 110.

Figure 2F:
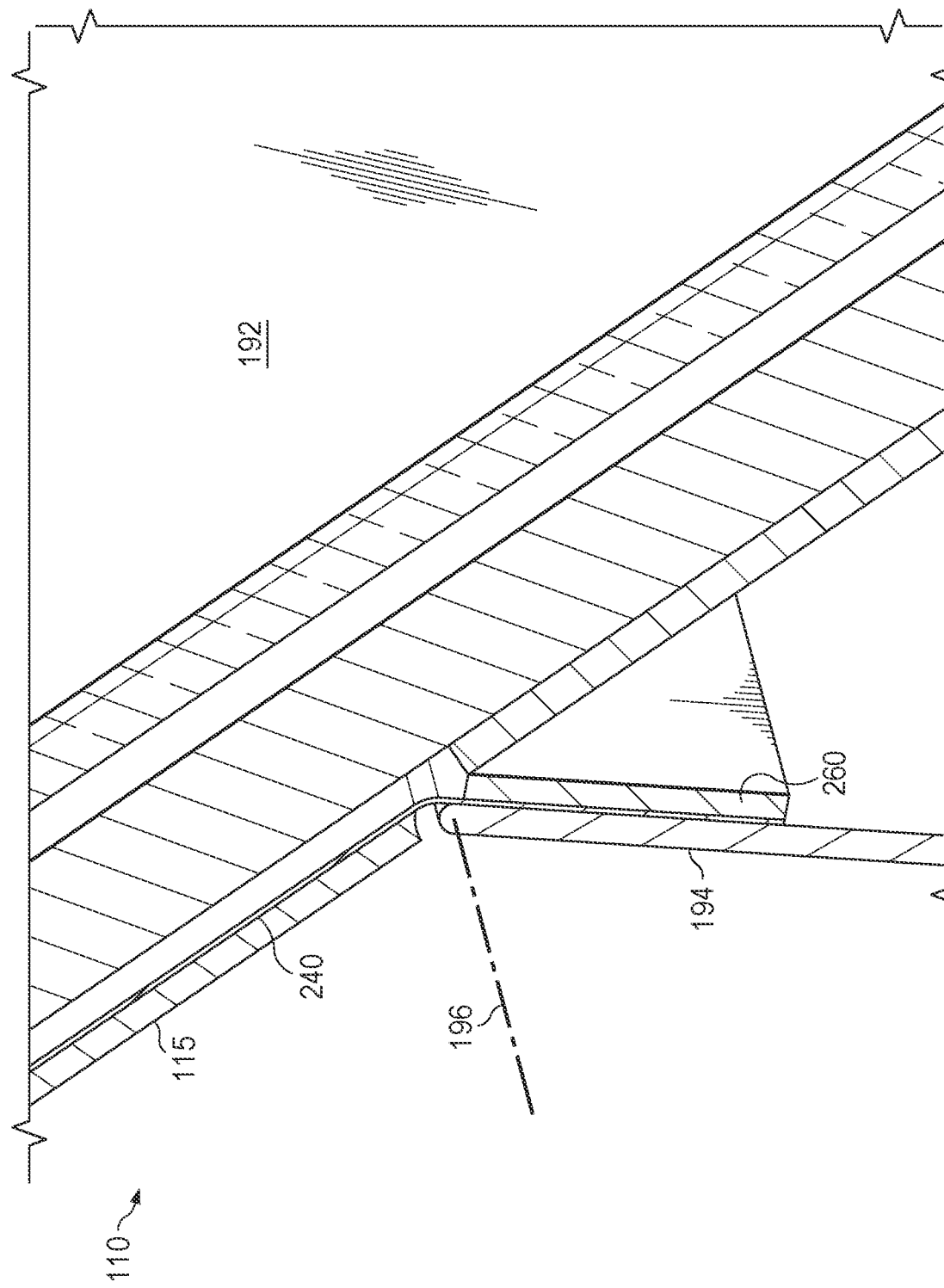
FIG. 2F illustrates another example of a cross section of an information handling system, according to one or more embodiments.

Turning now to FIG. 2F, another example of a cross section of an information handling system is illustrated, according to one or more embodiments. In one or more embodiments, flexible thermally conductive foil 240 may be thermally coupled to stand 194. For example, flexible thermally conductive foil 240 may be fastened to stand 194. For instance, stand 194 may transfer heat from flexible thermally conductive foil 240 to a surrounding environment of IHS 110. In one or more embodiments, a graphite beam 260 may be thermally coupled to flexible thermally conductive foil 240. For example, graphite beam 260 may be fastened to flexible thermally conductive foil 240. For instance, graphite beam 260 may transfer heat from flexible thermally conductive foil 240 to a surrounding environment of IHS 110. In one or more embodiments, one or more of stand 194 and IHS 110 may include graphite beam 260.

Figure 3A:
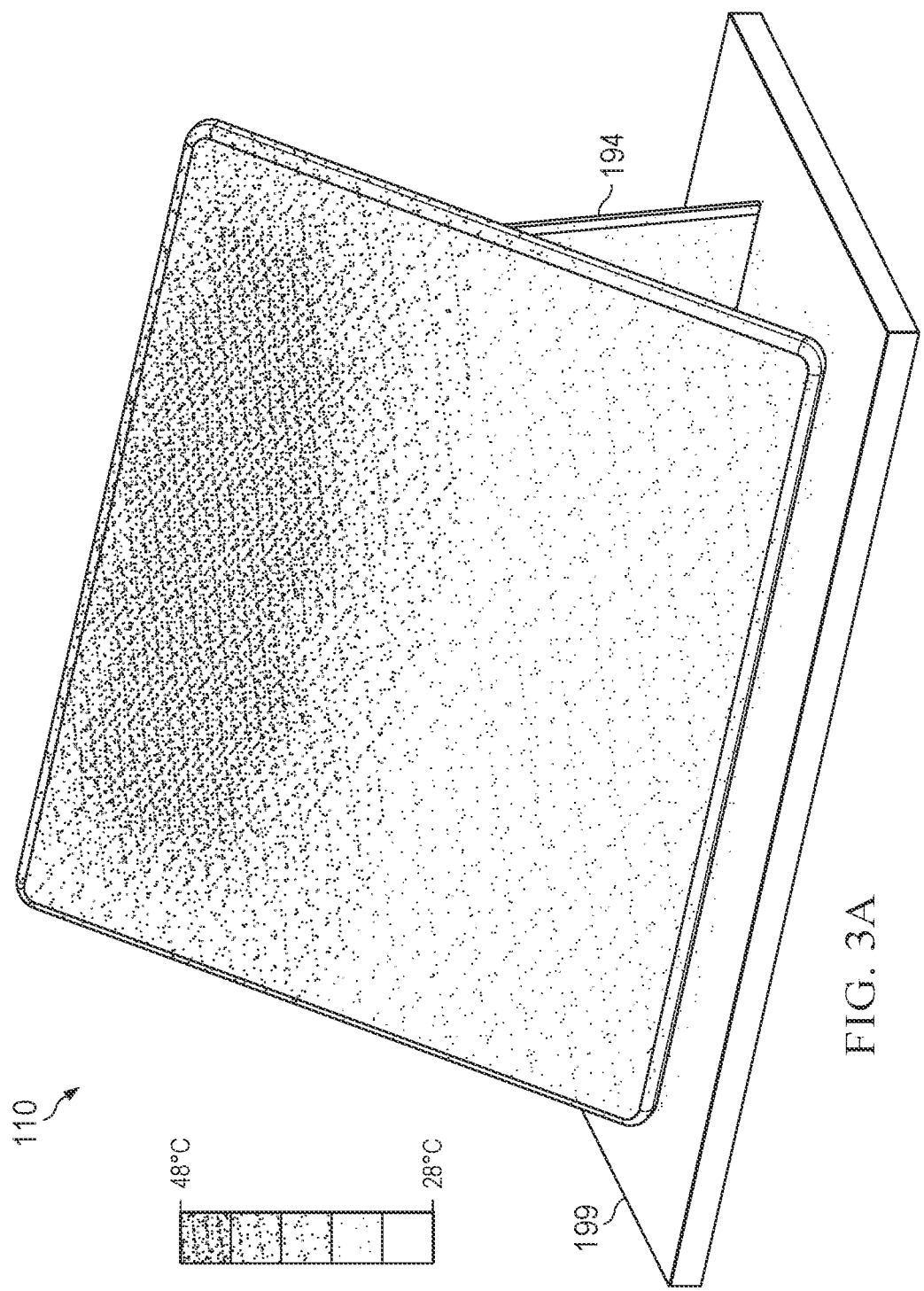
FIGS. 3A-3D illustrate example of heat distributions of information handling systems, according to one or more embodiments.
Figure 3B:
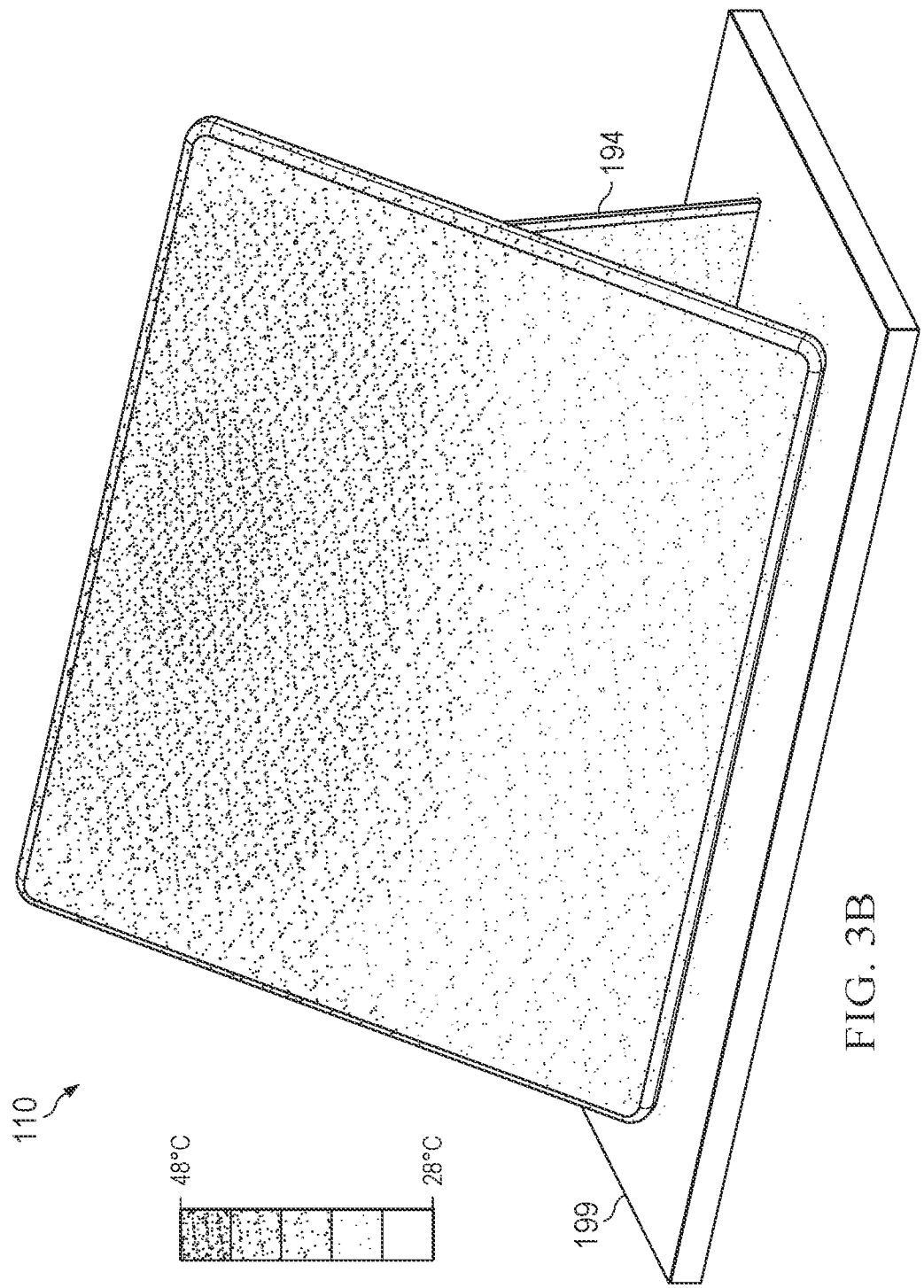
Figure 3C:
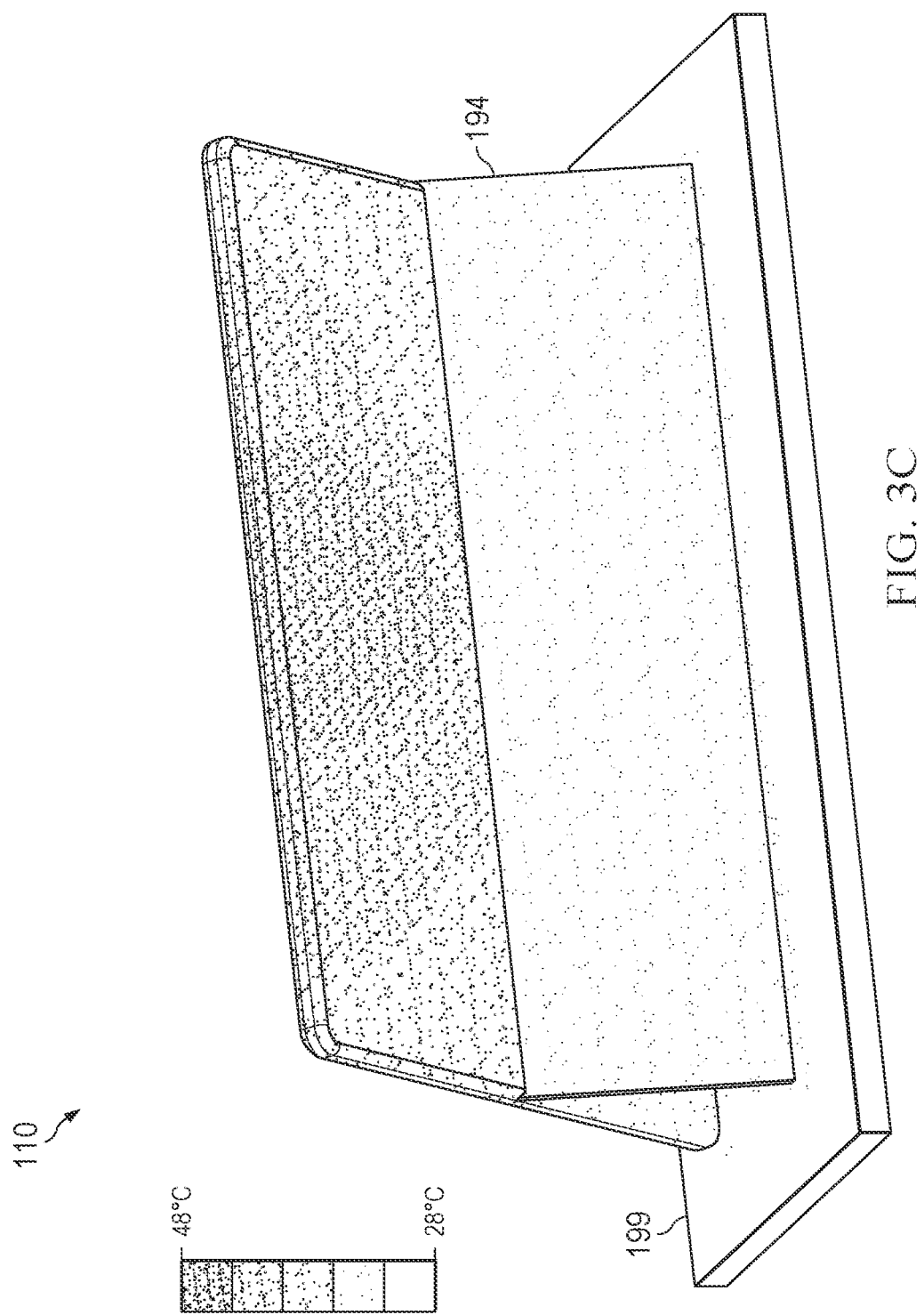
Figure 3D:
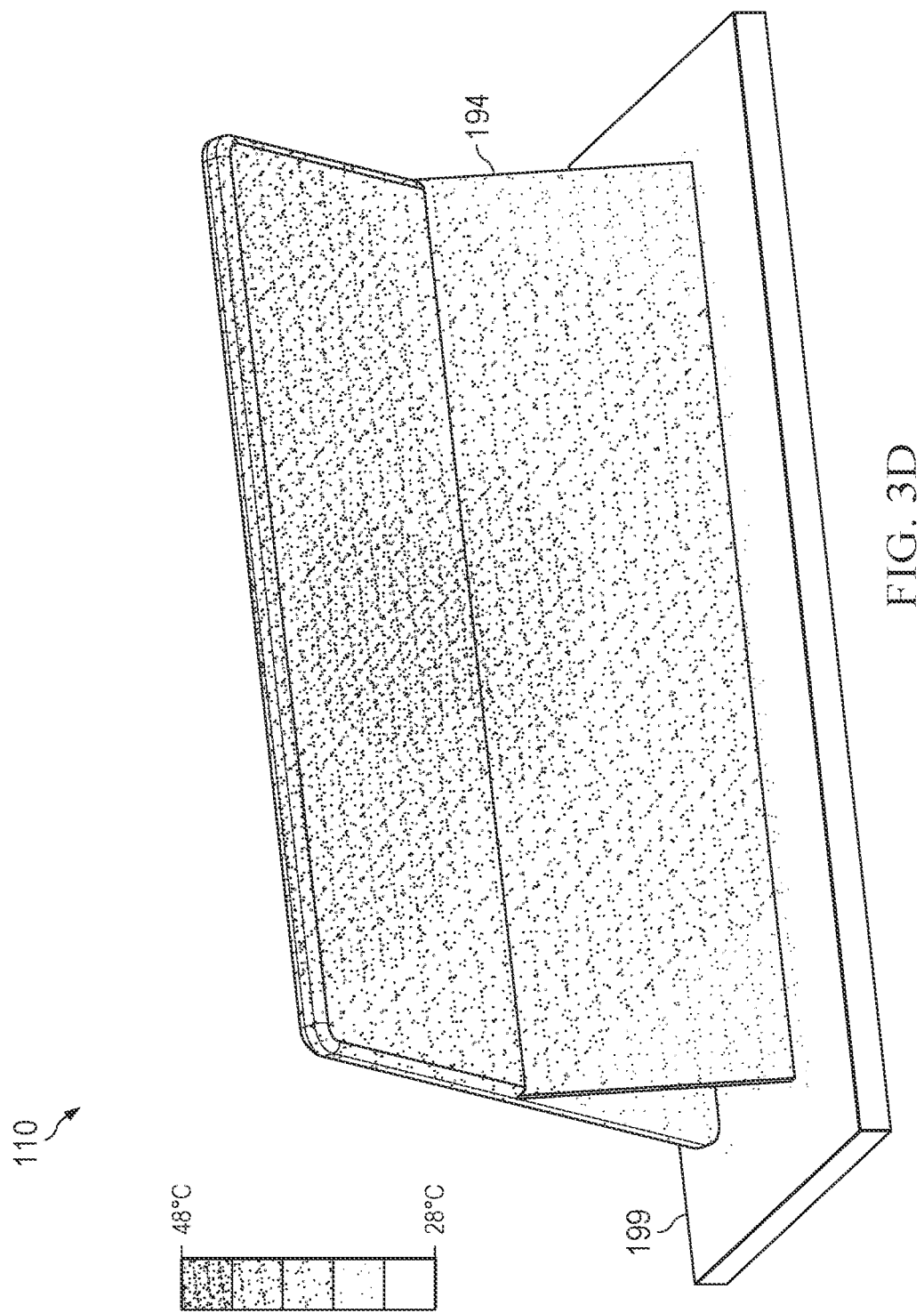

Turning now to FIGS. 3A-3D, example of heat distributions of information handling systems are illustrated, according to one or more embodiments. In one example, IHS 110 may not utilize stand 194 to dissipate heat, as shown in a front view of IHS 110 in FIG. 3A. In a second example, IHS 110 may utilize stand 194 to dissipate heat, as illustrated in a front view of IHS 110 in FIG. 3B. As shown, stand 194 in FIG. 3B is associated with a higher temperature than stand 194 in FIG. 3A. For instance, the heat associated with stand 194 in FIG. 3B is from one or more internal components of IHS 110, which may be dissipated into an environment of IHS 110. In a third example, IHS 110 may not utilize stand 194 to dissipate heat, as shown in a rear view of IHS 110 in FIG. 3C. In another example, IHS 110 may utilize stand 194 to dissipate heat, as illustrated in a rear view of IHS 110 in FIG. 3D. As shown, stand 194 in FIG. 3D is associated with a higher temperature than stand 194 in FIG. 3C. For instance, the heat associated with stand 194 in FIG. 3D is from one or more internal components of IHS 110, which may be dissipated into an environment of IHS 110.

Figure 4:
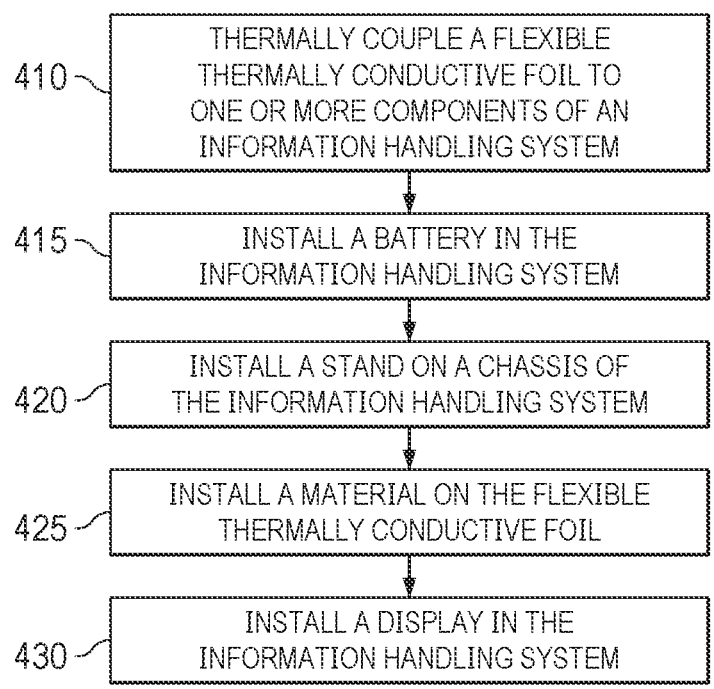
FIG. 4 illustrates an example of a method of configuring an information handling system, according to one or more embodiments.
Figure 5A:
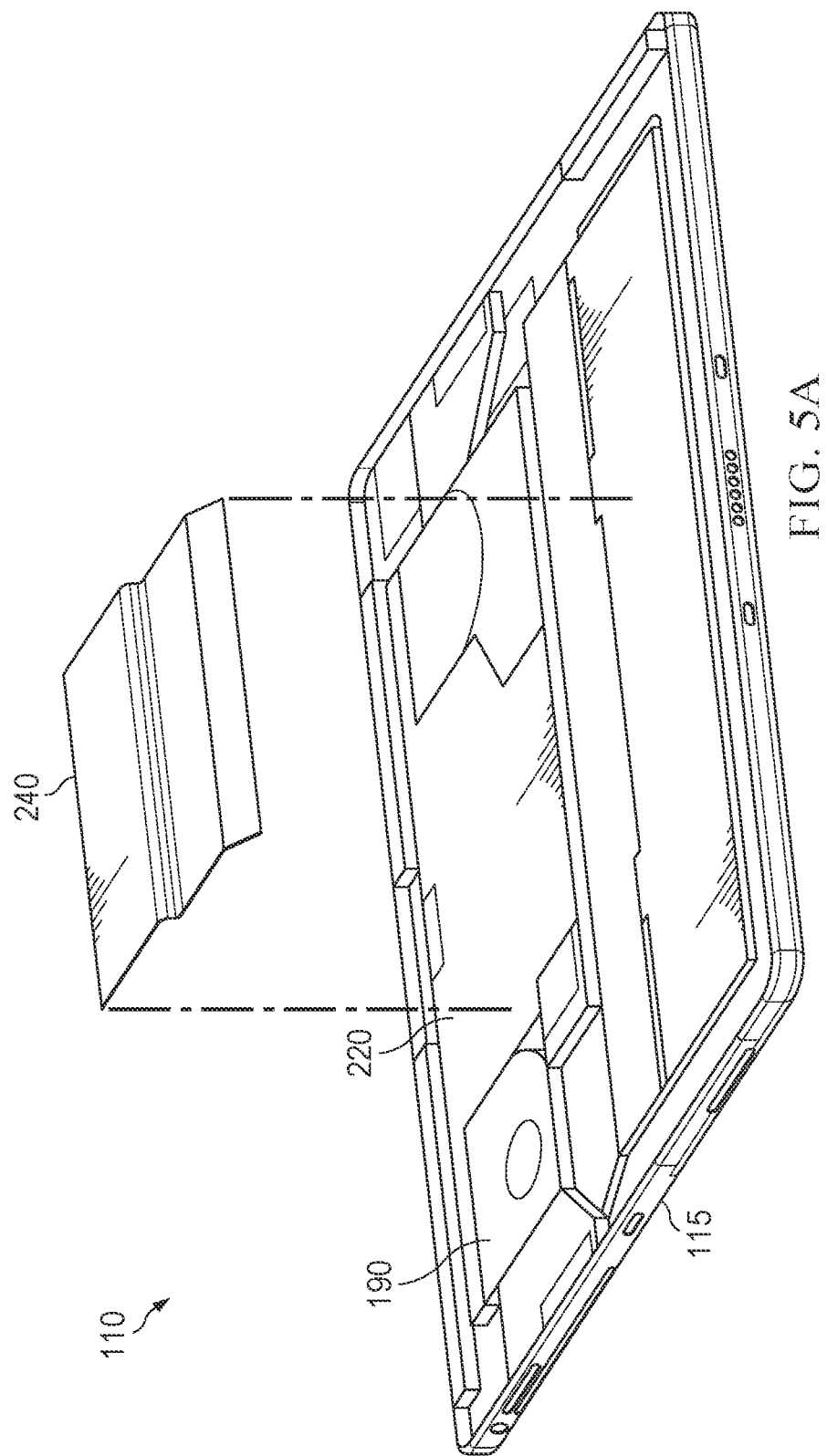
FIG. 5A illustrates an example of thermally coupling a flexible thermally conductive foil to one or more components of an information handling system, according to one or more embodiments.

Turning now to FIG. 4, an example of a method of configuring an information handling system is illustrated, according to one or more embodiments. At 410, a flexible thermally conductive foil may be thermally coupled to one or more components of an information handling system. For example, a flexible thermally conductive foil 240 may be thermally coupled to one or more of processor 120, BMC 130, volatile memory medium 150, non-volatile memory media 160 and 170, I/O subsystem 175, network interface 180, fans 190A-190N, heat transfer device 220, heat pipes 230A-230C, among others. In one instance, flexible thermally conductive foil 240 may be thermally coupled to one or more components of IHS 110 via a thermally conductive adhesive. In another instance, flexible thermally conductive foil 240 may be thermally coupled to one or more components of IHS 110 via mechanical pressure. As an example, flexible thermally conductive foil 240 may be thermally coupled to one or more components of IHS 110, as shown in FIG. 5A.

Figure 5B:
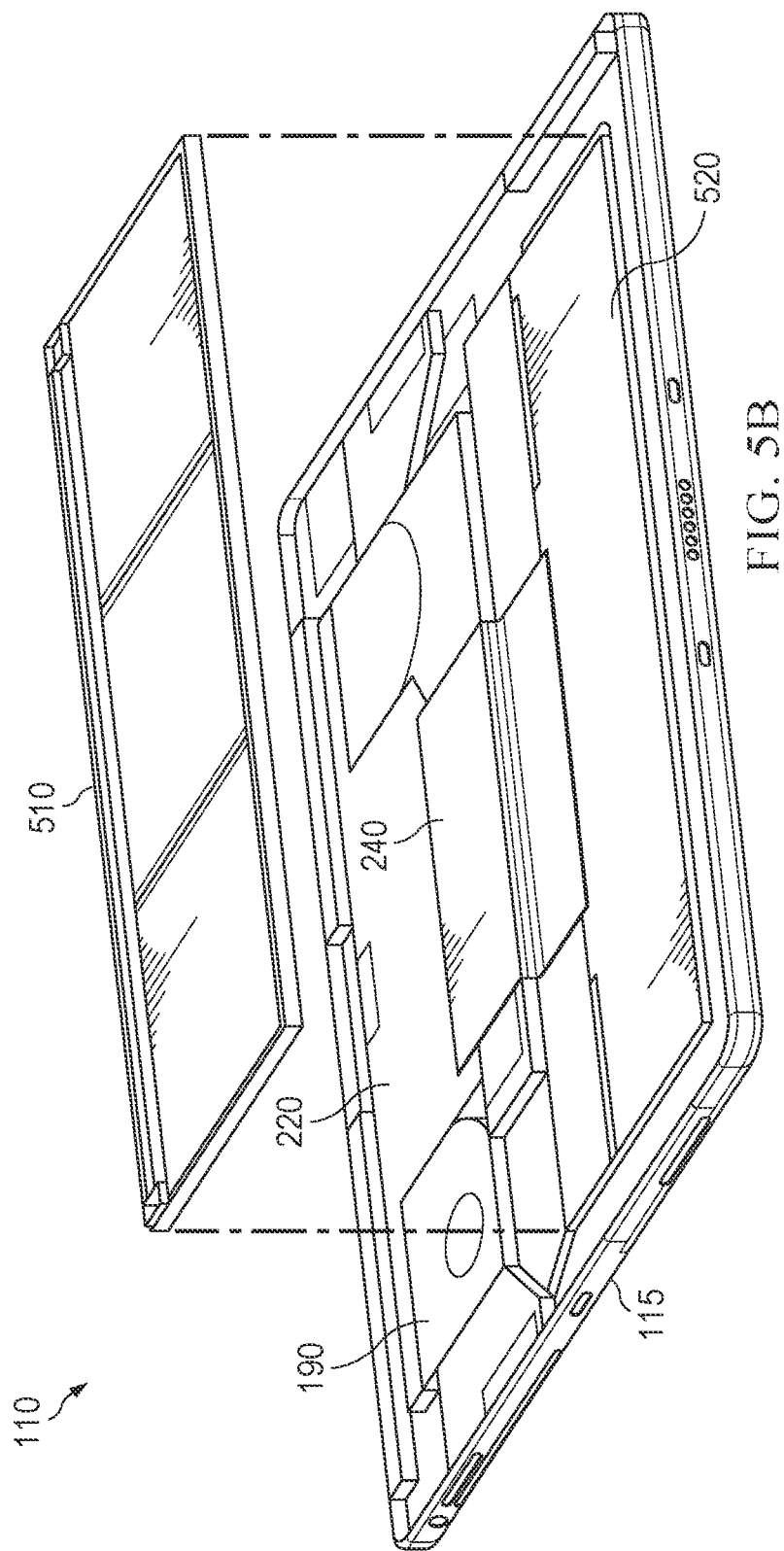
FIG. 5B illustrates an example of installing a battery in an information handling system, according to one or more embodiments.

At 415, a battery may be installed in the information handling system. For example, a battery 510 may be installed in IHS 110, as illustrated in FIG. 5B. For instance, chassis 115 may include a battery compartment 520. As an example, battery 510 may be installed in battery compartment 520 of chassis 115. In one or more embodiments, flexible thermally conductive foil 240 may be thermally coupled to compartment 520. In one example, flexible thermally conductive foil 240 may be thermally coupled to compartment 520 via a thermally conductive adhesive. In another example, battery 510 may apply pressure to flexible thermally conductive foil 240, which may thermally couple flexible thermally conductive foil 240 to compartment 520. In one or more embodiments, battery compartment 520 may provide power to one or more components of IHS 110.

Figure 5C:
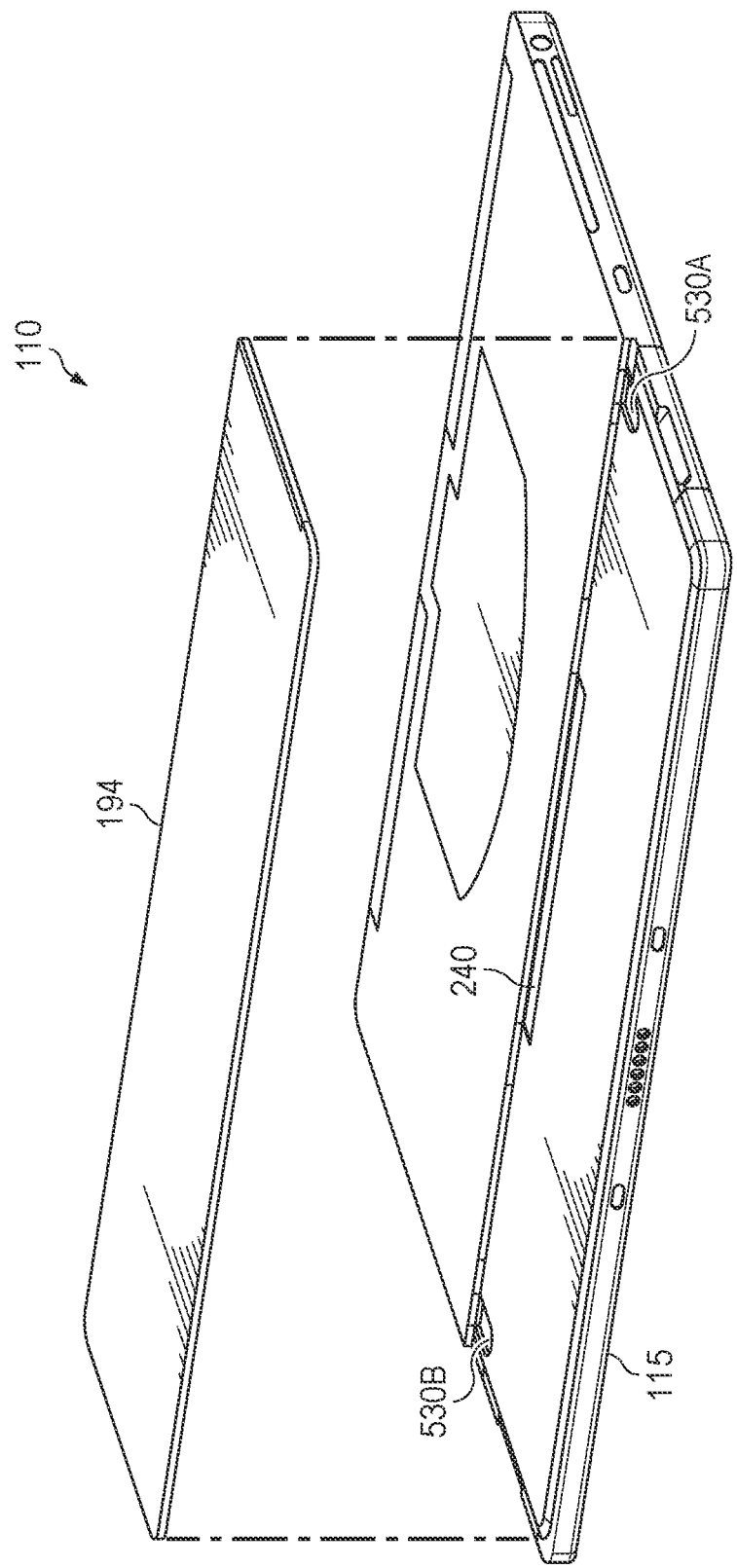
FIG. 5C illustrates an example of installing a stand on a chassis of an information handling system, according to one or more embodiments.
Figure 5D:
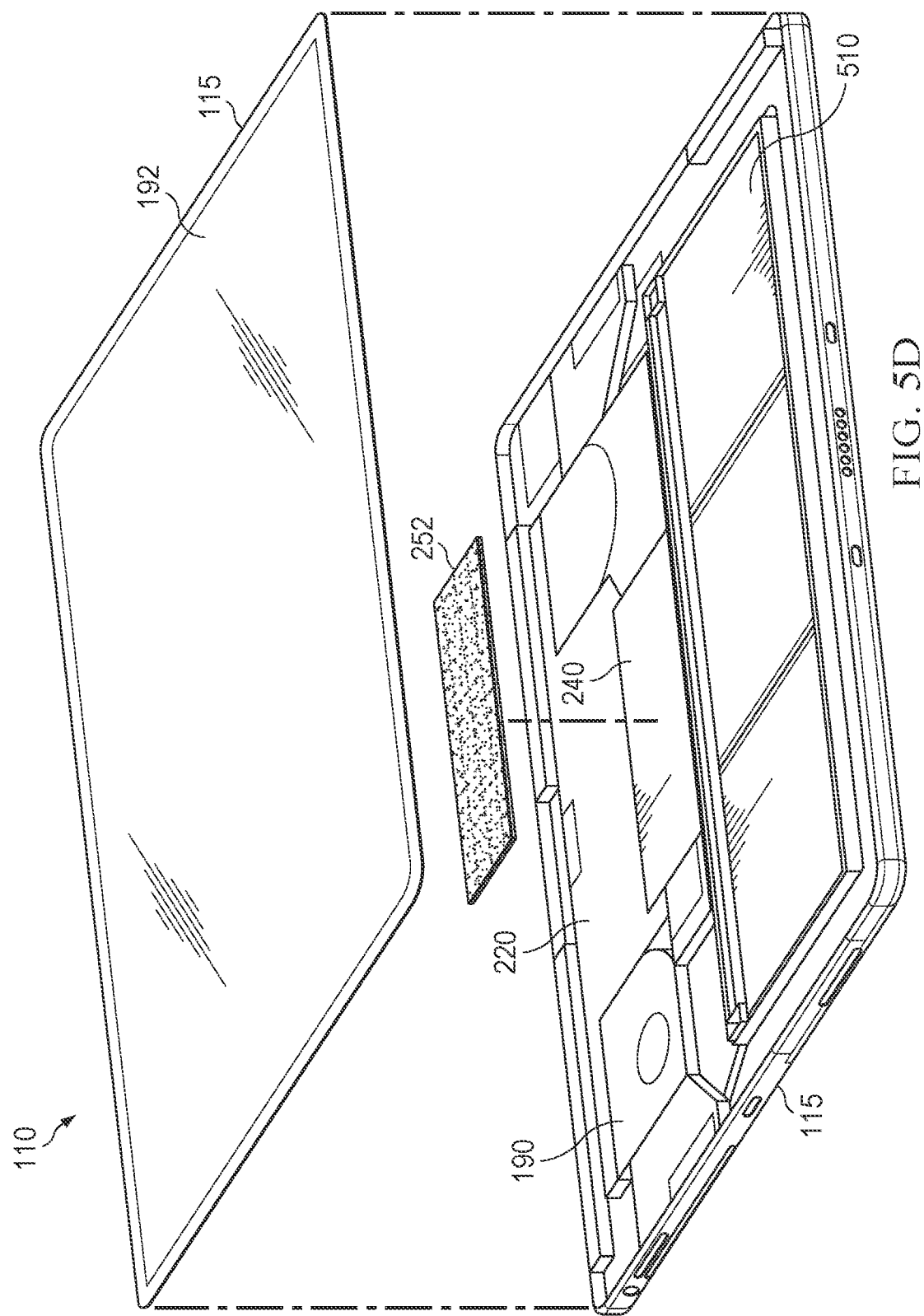
FIG. 5D illustrates an example of installing a material on a flexible thermally conductive foil and an example installing a display in an information handling system, according to one or more embodiments.

At 420, a stand may be installed on a chassis of the information handling system. For example, stand 194 may be installed on chassis 115, as shown in FIG. 5C. For instance, stand 194 may be installed in hinges 530A and 530B of chassis 115. In one or more embodiments, stand 194 may be thermally coupled to flexible thermally conductive foil 240. For example, stand 194 may be thermally coupled to flexible thermally conductive foil 240 via pressure from hinges 530A and 530B. At 425, a material may be installed on the flexible thermally conductive foil. For example, material 252 may be installed on flexible thermally conductive foil 240, as illustrated in FIG. 5D.

At 430, a display may be installed in the information handling system. For example, display 192 may be installed in IHS 110, as shown in FIG. 5D. In one or more embodiments, display 192 may apply pressure to material 252. For example, material 252 may apply pressure to flexible thermally conductive foil 240 from the pressure applied from display 192. For instance, flexible thermally conductive foil

240 may be thermally coupled to one or more components of IHS 110 from the pressure applied from material 252.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a memory medium, coupled to the at least one processor, that stores an operating system and at least one application executable by the at least one processor;
   a chassis that houses the information handling system and that includes a stand configured to rotate away from and towards a portion of a rear side of the chassis;
   a heat transfer device;
   a flexible thermally conductive foil, wherein a first portion of the flexible thermally conductive foil is thermally coupled to the heat transfer device and a second portion of the flexible thermally conductive foil is thermally coupled and physically coupled to the stand of the chassis;
   a material layer coupled to the first portion of the flexible thermally conductive foil, the material layer being configured to apply pressure to the first portion of the flexible thermally conductive foil to thermally couple the first portion of the flexible thermally conductive foil to the heat transfer device; and
   a graphite beam thermally coupled and physically coupled to the flexible thermally conductive foil that is thermally coupled and physically coupled to the stand of the chassis such that the thermally conductive foil is physically coupled between the stand of the chassis and the graphite beam,
   wherein the flexible thermally conductive foil is configured to thermally transfer heat from the heat transfer device and the material layer to the stand of the chassis,
   wherein the graphite beam is configured to transfer the heat from the flexible thermally conductive foil to an environment surrounding the information handling system, and
   wherein the stand includes at least one of a metal and graphite to transfer the heat from the flexible thermally conductive foil to the environment in an area of the flexible thermally conductive foil that overlaps with the graphite beam.

2. The information handling system of claim 1, further comprising:
   a display;
   wherein the chassis houses the display; and
   wherein the material layer is pliable and is configured to transfer the pressure from the display to the flexible thermally conductive foil.

3. The information handling system of claim 1,
   wherein the information handling system is a tablet information handling system or a wireless telephone information handling system; and
   wherein the stand is a kickstand of the chassis.

4. The information handling system of claim 1, wherein the flexible thermally conductive foil includes at least one graphite foil.

5. The information handling system of claim 1, wherein the graphite beam is one-half millimeter to three millimeters thick.

6. The information handling system of claim 1, wherein the chassis includes at least one hinge that couples the stand to the chassis.

7. The information handling system of claim 6, wherein the stand is rotatably attached to the chassis.

8. The information handling system of claim 7, wherein the at least one hinge is configured to be adjusted to preset hinge stops that permit the stand to be configured at different preset positions.

9. The information handling system of claim 7, wherein the at least one hinge is configured to be adjusted to continuously rotate through an angle, which permits the stand to be configured at different positions within the angle.

10. The information handling system of claim 1, wherein the stand is removable.

11. The information handling system of claim 1, further comprising:
    at least one thermal pipe thermally coupled to the heat transfer device.

12. The information handling system of claim 11, wherein the flexible thermally conductive foil is thermally coupled to the at least one thermal pipe.

* * * * *